United States Patent [19]

Coulon et al.

[11] 4,265,850

[45] May 5, 1981

[54] PROCESS AND APPARATUS FOR THE PRODUCTION OF SPECTACLE FRAME PARTS OF SYNTHETIC MATERIAL

[75] Inventors: Michel Coulon, Champs-sur-Marne; Gérard Laprade, St Maur des Fosses, both of France

[73] Assignee: Essilor International Cie Generale d'Optique, Joinville-le-Pont, France

[21] Appl. No.: 923,320

[22] Filed: Jul. 10, 1978

[30] Foreign Application Priority Data

Jul. 13, 1977 [FR] France .................. 77 21604

[51] Int. Cl.³ .................. B29C 1/02; B29F 1/00
[52] U.S. Cl. .................. 264/225; 249/126; 249/127; 249/168; 264/328.1; 264/331.17; 264/337; 351/154; 425/542; 425/595; 425/DIG. 59
[58] Field of Search .................. 264/328, 331, 225, 337; 425/117, 394, 127, DIG. 59, 595; 249/119, 126, 127, 128, 168; 351/154

[56] References Cited

U.S. PATENT DOCUMENTS

| 1,510,001 | 9/1924 | Gunning | 264/328 X |
|---|---|---|---|
| 1,630,262 | 5/1927 | Fraser | 264/328 X |
| 2,132,106 | 10/1938 | Graham | 351/154 X |
| 2,361,900 | 10/1944 | Lowry et al. | 264/331 X |
| 2,516,373 | 7/1950 | Ehlert | 425/394 |
| 2,601,180 | 6/1952 | Stuart et al. | 249/127 X |
| 2,624,916 | 1/1953 | Persak | 264/328 |
| 2,746,087 | 5/1956 | Dolezal | 264/320 X |
| 3,423,488 | 1/1969 | Bowser | 264/225 X |
| 3,582,193 | 6/1969 | Bogyos | 351/154 X |
| 3,662,693 | 5/1972 | Dana | 425/117 X |
| 3,806,079 | 4/1974 | Beattie | 249/126 |
| 3,829,263 | 8/1974 | Yao et al. | 425/127 X |
| 3,850,902 | 11/1974 | Metcalfe et al. | 264/225 X |
| 3,931,373 | 1/1976 | Beattie | 264/225 X |
| 4,147,324 | 4/1979 | Walter | 249/126 X |
| 4,161,060 | 7/1979 | Lenne et al. | 264/219 X |

FOREIGN PATENT DOCUMENTS

| 41294 | 10/1909 | Austria | 249/126 |
|---|---|---|---|
| 207333 | 9/1907 | Fed. Rep. of Germany | 249/119 |
| 43136 | 2/1934 | France | 425/394 |

OTHER PUBLICATIONS

Zimmerman, O. T. and Irvin Lavine, "Supplement III to the 1953 Edition of Handbook of Material Trade Names" Dover, N.H., Industrial Research Service, 1960, p. 86.

Primary Examiner—Philip Anderson
Attorney, Agent, or Firm—Charles E. Brown

[57] ABSTRACT

The invention relates to the production of spectacle frame parts of synthetic material and in particular to the moulding of spectacle frame faces of synthetic material, for example, of polyurethane.

The faces are moulded between two casting half-moulds each comprising a plate having an impression on one surface thereof. Each plate has a substantially equal thickness at every point and is made of a polyolefine. Use of such half-moulds enables the faces of spectacle frames to be directly moulded into their final shape.

15 Claims, 12 Drawing Figures

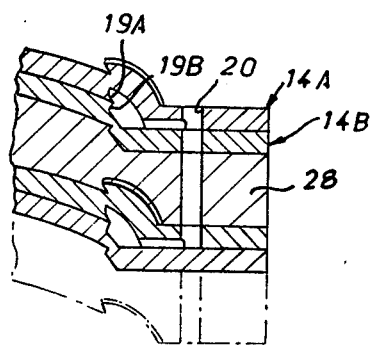
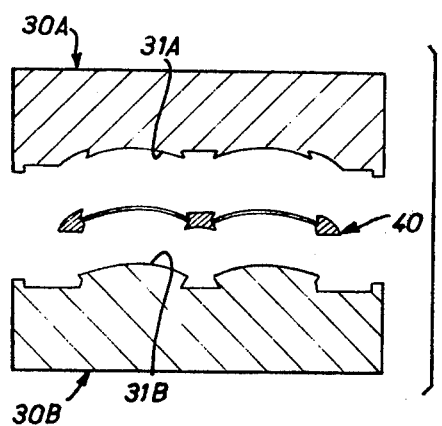
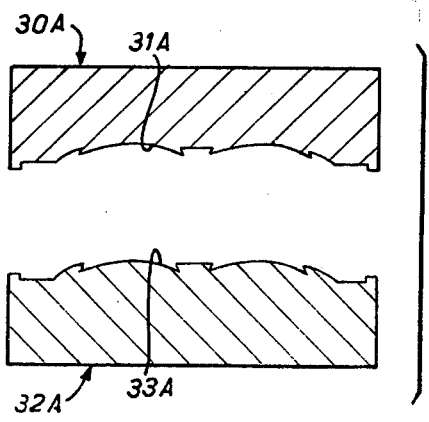
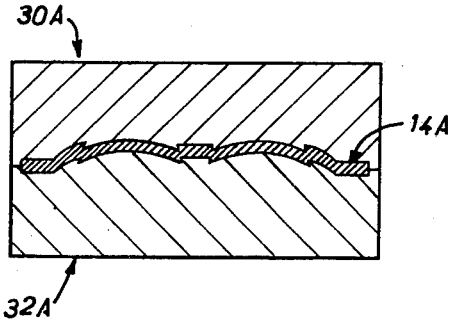
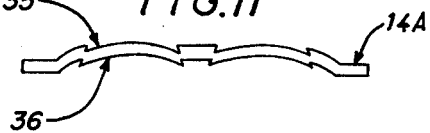

4,265,850

PROCESS AND APPARATUS FOR THE PRODUCTION OF SPECTACLE FRAME PARTS OF SYNTHETIC MATERIAL

BACKGROUND OF THE INVENTION

The present invention relates generally to the economical production of parts of synthetic material for spectacle frames, and more particularly of the face forming part of such frames.

As is well known, the term spectacle frame face is usually applied to that portion of the frame which is adpated to be equipped with ophthalmic lenses, excluding the side arms which are subsequently hinged to the face in order to enable the spectacles to be worn.

It has already been proposed to make spectacle frame faces of synthetic material.

However, the synthetic material usually employed for this purpose hitherto has most often been cellulose acetate.

A synthetic material of this kind cannot be moulded by casting and consequently only be machined or injection moulded.

The present invention has the object of permitting the production of faces of synthetic material by casting directly with the final shape of the faces, without the latter having to be subsequently subjected to a machining and/or polishing operation of any kind.

It is true that it is known for any product to be produced by moulding with the final shape required for it, by moulding the corresponding material between two half-moulds, usually by injection, and it is conceivable for a process of this kind to be applied indiscriminately to the moulding of faces of synthetic material for spectacle frames.

The present invention nevertheless proposes to permit such production at lowest cost by suitable selection of the material of which the half-moulds used are composed, of their structure, and of the moulding process to be employed.

SUMMARY

According to the present invention there is provided a process for the production of spectacle frame parts of synthetic material, comprising moulding the synthetic material by casting between two half-moulds, wherein the half-moulds are of a material containing a polyolefine, and wherein the half-moulds are in the form of plates having substantially the same thickness at every point. In practice the two faces of a plate of this kind are globally deduced from one another by translation.

By "material containing a polyolefine" is here understood not only an actual polyolefine, for example a a high or low density polyethylene or a polypropylene, but also a polyolefine copolymer.

It is true that it has already been proposed to use such a material for the moulding of ophthalmic lenses. However, the present invention relates to the moulding of parts of more complex shapes than those of such lenses.

The particular selection according to the invention of half-moulds of a material containing a polyolefine for the moulding of such parts provides the advantage that it is possible to avoid the always relatively expensive use of a mould release agent, provided that at the same time a synthetic material which during the moulding will not ahdere to a material containing a polyolefine is selected as synthetic material to be moulded.

Numerous synthetic materials may be satisfactory in this respect, particularly the polyurethane resins, the epoxy resins, the polyesters, and the acrylic resins.

However, according to the invention preference is given to the polyurethane resins which, in addition to the advantage that during the moulding they do not adhere to the half-moulds of material containing a polyolefine, provide the additional advantage that in the case of the moulding of spectacle frame faces they can easily be coloured to the shade desired for such faces, and that they require no polishing, a coating of varnish being sufficient to impart to them the desired surface finish.

Conjointly, the fact that according to the invention the half-moulds used are in the form of plates of constant thickness also provides advantages.

Because of their uniform thickness plates of this kind provide uniform cooling of all parts of the faces moulded between them. In addition the plates can be produced in large numbers at high speeds by injection moulding which provides for their mould impression a surface quality which is directly satisfactory; they can in fact be directly and rapidly made available in large numbers for the production of the desired faces, thus making it possible to meet the very short delivery times which are generally demanded for the production of such faces.

The present invention also provides the casting half-moulds of constant thickness of material containing a polyolefine which are suitable for the casting of spectacle frame parts of synthetic material according to the process briefly explained above.

In addition to the previously mentioned advantages which they afford, these casting half-moulds of constant thickness, of material containing a polyolefine, may advantageously be transparent, thus permitting visual inspection of the moulding effected by them, and/or they may have a certain elasticity.

In accordance with a development of the invention this elasticity is utilised to reduce in optimum manner the cost of production of spectacle frame faces moulded in casting half-moulds of this kind.

According to this aspect the impression of a casting half-mould according to the invention has in particular an undercut portion.

This relates for example to the periphery of the zones of the said impression which correspond to the rims of the face which is to be moulded, that is to say those portions of the face which are intended to receive the ophthalmic lenses.

By undercutting the corresponding zones of the casting half-moulds used in accordance with the invention it is possible to produce directly the bezel which such rims must have in order to hold the corresponding ophthalmic lenses.

It is clear that an undercut zone of this kind is acceptable in a mould only if the latter has sufficient elasticity to permit removal of the moulded faces without tearing.

This is precisely the case with the materials containing a polyolefine which are used according to the invention to form the casting half-moulds intended for the moulding of such faces.

The formation of the bezels in the moulded face by means of undercut zones of the corresponding casting half-moulds makes it possible in an advantageous manner to avoid the use in these half-moulds of false lenses attached to one or the other of the half-moulds, the placing in position of these false lenses giving rise at the present time to a considerable waste of time in the usual moulding processes for the production of spectacle frame faces.

According to the invention the impression of the casting half-mould preferably has formed in it, as a depression, at least one undercut seat suitable for receiving an insert which is to be secured in the face being moulded.

This may for example apply to the knuckles necessary for the hinging of the side arms on the face produced.

Because of the elasticity of the material containing a polyolefine which is used, whereby such inserts can be extracted without tearing from the seats in which they were previously placed in position, the spectacle frame faces are directly moulded over these inserts, and the latter are therefore economically fastened to the face during the actual moulding of the latter without it being necessary to provide any subsequent operation to achieve this fastening.

Thus the invention makes it possible for spectacle frame faces to be obtained direct by moulding in the final configuration desired for them and already equipped with knuckles suitable for enabling side arms to be hinged on them.

The present invention also provides a process for the production of the casting half-moulds of constant thickness which are to be used, this process comprising injecting material containing a polyolefine between two injection half-moulds, the impression of one of which, forming a positive, is deduced from the other, forming a negative.

Where no undercut is to be provided, that is to say in cases where in the moulding of the faces in question between two casting half-moulds it is sufficient to place false lenses in position, the injection half-mould whose impression forms a negative may for example be obtained by moulding any material, for example a synthetic material, particularly an epoxy resin, on a pattern corresponding to the spectacle frame face which is to be obtained.

On the other hand, in cases where, as previously explained, it is preferred to provide undercuts, the injection half-moulds necessary for moulding the casting half-moulds may for example be obtained by machining.

However this may be, it is possible for the casting half-moulds necessary for producing the desired spectacle frame faces to be obtained economically by injection moulding.

The fact that these casting half-moulds are made in the form of plates facilitates the injection moulding and eliminates all tension during this injection moulding.

Taking into account this ease of production of these casting half-moulds and in addition taking into account the fact that the materials containing a polyolefine of which they are made provide the advantage of being recyclable, for the mass production of spectacle frame faces it is possible to produce a large number of pairs of casting half-moulds suitable for the simultaneous production of a corresponding number of such faces, and to use these casting half-moulds economically in batteries, with the advantages mentioned above.

The invention therefore provides the advantage of permitting rapid production in large numbers of spectacle frame faces of synthetic material in the desired manner.

BRIEF DESCRIPTION OF THE DRAWINGS

Embodiments of the present invention will hereinafter be described, by way of example, with reference to the accompanying drawings, in which:

FIG. 7 shows a view similar to FIG. 5 of a further embodiment;

FIG. 8 shows a longitudinal section of a pattern corresponding to the face which is to be moulded interposed between two injection half-moulds shown in corresponding section and suitable for moulding casting half-moulds;

FIG. 9 shows one of the injection half-moulds of FIG. 8, together with the other injection half-mould with which it is to be paired;

FIG. 10 illustrates the association of the two injection half-moulds of FIG. 9 for moulding a casting half-mould;

FIG. 11 shows an end view of the casting half-mould obtained from the injection half-moulds of FIG. 10; and FIG. 12 shows an end view of a casting half-mould to be paired with the half-mould shown in FIG. 11.

DESCRIPTION OF PREFERRED EMBODIMENTS

Figure 1:
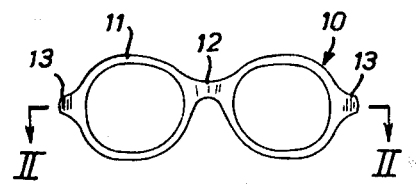
FIG. 1 is an elevation of a face of a spectacle frame to be produced by moulding.

FIG. 1 shows a front elevation of a face 10 for a spectacle frame which is to be produced by moulding a synthetic material belonging to the group formed by the polyurethane resins, epoxy resins, polyesters, and acrylic resins.

In a manner known per se a face 10 of this kind comprises two rims 11 joined to one another by a central bridge 12 of saddle shape.

In the example illustrated each rim 11 has a lateral projection 13 suitable for receiving the knuckle necessary for hinging a spectacle side arm.

According to the invention a spectacle frame face as 10 is produced by casting synthetic material between two casting half-moulds 14A, 14B made of material containing a polyolefine, and preferably consisting of polyolefine, such as high or low density polyethylene or polypropylene. Alternatively, the material of the hald-moulds may be a polyolefine copolymer.

It has been found that the use on the one hand of a polyolefine based material of this kind to form the aforesaid casting half-moulds 14A, 14B, and on the other hand a synthetic material belonging to the group mentioned above to form the desired face 10, advantageously eliminates the necessity to use ay mould release agent.

Preferably, and as illustrated, each of the casting half-moulds, 14A, 14B is in the form of a plate of constant thickness, that is to say a plate having the same thickness EA, EB at every point.

This thickness is moreover advantageously the same for the two casting half-moulds 14A and 14B.

The impression 16A of the casting half-mould 14A corresponds to one of the surfaces, in this particular case the front surface, of the face 10 which is to be produced, whilst the impression 16B of the casting half-mould 14B corresponds to the opposite surface, in this case the rear surface of the said face, taking into account the mould parting line which is also necessary for the relative delimintation of these two surfaces, as is customary in moulding technology.

Figure 3:
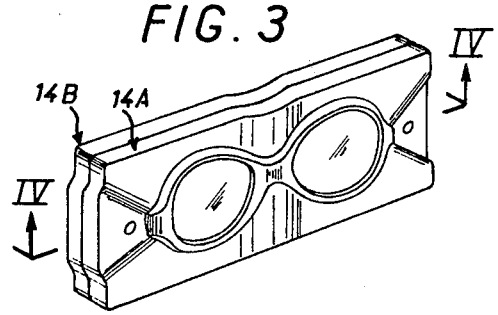
FIG. 3 is a perspective view of the two casting half-moulds.
Figure 2:
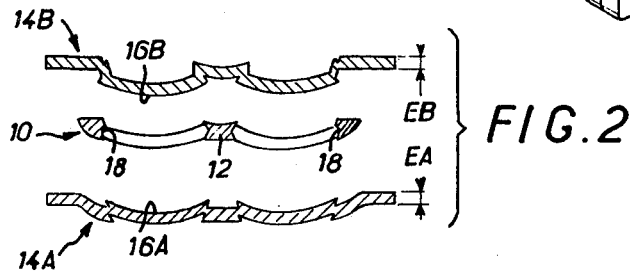
FIG. 2 shows a longitudinal section, taken on line II—II of FIG. 1, of the face interposed between two casting half-moulds also shown in longitudinal section.
Figure 4:
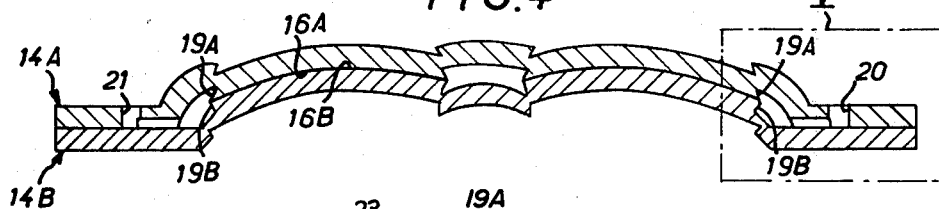
FIG. 4 shows on a larger scale a section of these casting half-moulds, taken on line IV—IV of FIG. 3.

However, if the two half-moulds 14A and 14B are made of a material containing a polyolefine, the natural elasticity of a material of this kind can be utilised and the impressions 16A, 16B of these two half-moulds 14A, 14B can be arranged; as regards the portions of these impressions which correspond to the inside volumes bounded by the rims 11 of the face 10 which is to be produced; so that after assembly (FIGS. 3 and 4) the two half-moulds come into contact with one another.

As is well known, the inner periphery of each rim 11 of a face 10 has formed in it a groove 18, usually known as a bezel, suitable for retaining the ophthalmic lens which the rim is intended to receive.

This has the consequence that each of the casting half-moulds 14A, 14B has in corresponding positions an undercut portion 19A, 19B suitable for conjointly participating in the formation of a bezel of this kind for each of the zones of the impressions 16A, 16B which correspond to the formation of the rims 11 of the face 10 which is to be produced.

One of the casting half-moulds 14A, 14B, in the example illustrated the half-mould 14A, is provided with a feed channel 20 in communication with the moulding space defined by these two casting half-moulds, for the purpose of feeding moulding material into the said moulding space. In addition, one of the half-moulds 14A, 14B, in the example illustrated the half-mould 14A, has a channel 21 spaced from the feed channel 20 and forming a vent providing communication between the moulding space and the atmosphere so that air present in the moulding space can be discharged during moulding.

From the foregoing it will be clear that the two casting half-moulds 14A, 14B permit direct moulding in synthetic material of a face 10 with the exact, final configuration of the latter, without it being necessary for false lenses to be used during this moulding operation.

Figure 5:
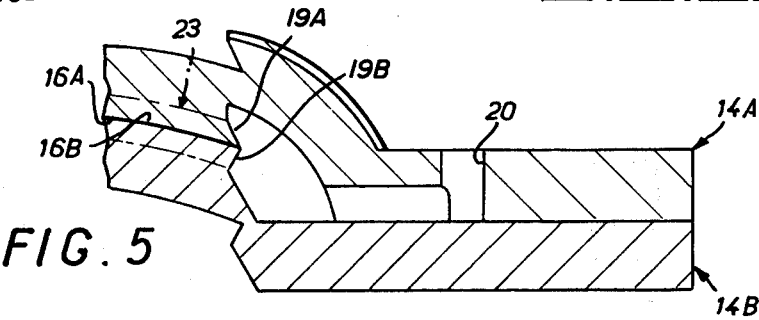
FIG. 5 shows on a larger scale the detail enclosed in the box V of FIG. 4.

If however it is required to avoid the presence of the undercut portions 19A, 19B on the casting half-moulds 14A, 14B, it is necessary to use such false lenses, as indicated diagrammatically in broken lines 23 in FIG. 5.

However, as indicated above, the elasticity inherent in the polyolefine base material used to form the casting half-moulds 14A, 14B can make it possible for such false lenses 23 to be dispensed.

Figure 6:
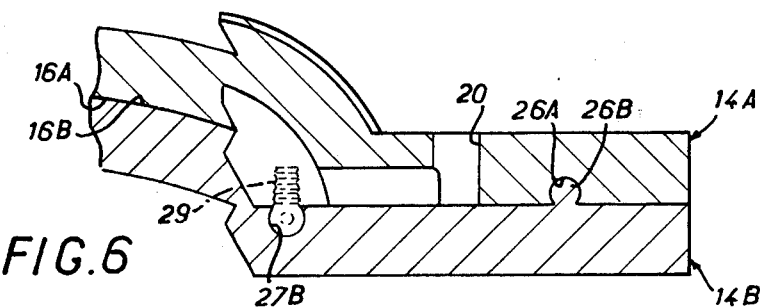
FIG. 6 shows a view similar to FIG. 5 of a modified embodiment.

In the modified embodiment illustrated in FIG. 6, the elasticity of the material of the half-moulds is also utilised to effect controlled fastening of the two casting half-moulds 14A, 14B for the purpose of the moulding operation.

In this embodiment, the casting half-mould 14B is provided, at some distance from its impression 16B, with a clipping element 26B, in this particular case a projecting stud, for cooperation with a complementary clipping element 26A, in this particular case a recess, provided for this purpose in a corresponding position on the half-mould 14A.

A plurality of pairs of corresponding clipping elements may obviously be provided on the casting half-moulds.

Alternatively, the two casting half-moulds 14A, 14B may be secured together by welding or by an auxiliary clamping device in a manner known per se and not illustrated.

In the modified embodiment illustrated in FIG. 6 the impression 16B of the half-mould 14B is additionally provided with an undercut recess 27B suitable for receiving an insert 29 which is to be fastened in the face to be moulded, as indicated in broken lines in FIG. 6.

This insert is for example the knuckle suitable for hinging the corresponding spectacle side arm to a rim 11.

The elasticity of the material used for producing the casting half-moulds 14A, 14B, enables an insert 29 of this kind to be released from its recess 27B without tearing on the removal from the mould of the face in which an insert of this kind is thus fastened.

According to the invention the desired face is moulded directly in its final configuration, thus preventing it from being deformed through the action of heat, which generally occurs if a face is moulded flat and then shaped under heat after moulding. In such a case, in fact, the fact may, when subjected to the action of heat, inopportunely resume the flat configuration in which it was moulded.

In the modified embodiment illustrated in FIG. 7, a battery of casting moulds, each formed of two complementary casting half-moulds, is used simultaneously, a spacer plate 28 being inserted between each mould and the next.

It is thus possible for the faces in question to be produced in large numbers.

The feed channel 20 of each mould is obviously in communication through the intermediate spacer plate 28 with the feed channel 20 of the mould lying beneath it.

The same is true of the associated vents.

Furthermore, in a battery of moulds of this kind each casting half-mould adjoining a spacer plate 28 is fitted onto the plate by its surface opposite to that on which the impression is provided.

The casting half-moulds 14A, 14B are preferably made by injection moulding of polyolefine, or of a material containing polyolefine, between two corresponding injection half-moulds, the impression of one of them, forming a positive, being deduced from the other, forming a negative.

The injection half-mould whose impression forms a negative may be made by machining.

It may however also be made by moulding in any material, for example a synthetic material, particularly an epoxy resin, on a pattern corresponding to the face 10 which is to be produced.

This possibility is illustrated in FIG. 8.

In FIG. 8, 30A designates an injection half-mould corresponding to one of the sides of the face 10 which is to be produced, 30B designates an injection half-mould corresponding to the other side of this face, and 40 designates the pattern corresponding to the face in question.

The impressions 31A, 31B of these injection half-moulds constitute negatives. p From the injection half-mould 30A is deduced an injection half-mould 32A whose impression 33A forms a positive of the shape formed as a negative by the impression 31A of the injection half-mould 30A (FIG. 9).

As illustrated in FIG. 10, the two injection half-moulds 30A, 32A can then be paired for the injection moulding of the desired casting half-mould 14A (FIG. 11) which has a generally concave or upper face 35 which is a positive replica and a generally concave or lower face 36 which is a negative replica.

Similarly, the injection half-mould 30A can be paired with an injection half-mould whose impression forms a positive of the shape formed as a negative by its own impression, for the injection moulding of the desired casting half-mould 14B (FIG. 12) which has a generally convex or upper face 37 which is a positive replica and a generally concave or lower face 38 which is a negative replica.

The present invention is not limited to the embodiments described and illustrated, but includes all modified embodiments.

Furthermore, its field of application is not limited to the moulding of spectacle frame faces, but also extends to the moulding of spectacle frame side pieces.

We claim:

1. A process for producing casting half-moulds for fabricating spectacle frame parts of synthetic material having complex, curved three-dimensional configuration with undercut portions, said process comprising the steps of providing injection half-moulds having impressions which are respectively negative and positive replicas of the shape of the ultimate spectacle frame part of curved complex three-dimensional configuration, and injecting homopolymers and copolymers of polyolefins into the cavity defined by the injection half-moulds, and removing the resulting injection moulded casting half-mould of substantially uniform thickness throughout from the cavity.

2. A process according to claim 1, wherein the impression which is a negative replica of the ultimate part is shaped by a pattern identical in shape to the part to be fabricated.

3. A process of producing spectacle frame parts of complex, curved three-dimensional configuration with undercut portions, said process comprising the steps of providing two complementary half-moulds, defining in one face of each half-mould an impression which is the negative replica of the complex, curved three-dimensional configuration of the spectacle frame part to be cast and in the opposite face a positive replica of the part to be cast, the thickness of each of the half-moulds being substantially uniform throughout, positioning the half-moulds in casting relationship so as to define a casting cavity which is a negative replica of the part to be cast, casting material in the cavity so defined and removing the casting from the cavity in its ultimate complex, curved three-dimensional configuration with undercut portions.

4. A process according to claim 3, comprising arranging a battery of pairs of half-moulds to define a plurality of moulding cavities, inserting spacer plates between consecutive moulds and casting spectacle frame parts in all said cavities.

5. A process according to claim 3 wherein the casting is removed from the half-moulds in its final configuration.

6. A process according to claim 3 wherein said half-moulds are made of homopolymers and copolymers of polyolefins and said frame parts are formed of synthetic material.

7. A process according to claim 6, wherein said synthetic material is selected from the group consisting of polyurethane resins, polyesters aned acrylic resins.

8. A process according to claim 6, wherein the synthetic material is selected to not adhere to the material of the half-moulds during casting.

9. A casting half-mould for casting plastic spectacle parts, in particular spectacle fronts, in their final complex, curved three-dimensional configuration with undercut portions, said half-mould comprising a plate made of homopolymers and copolymers of polyolefin and having one face including an impression defining the negative replica of the complex, curved three-dimensional spectacle part configuration with undercut portions, the opposite face defining the positive replica of said configuration, and the thickness of said plate being substantially uniform throughout.

10. A casting half-mould according to claim 9, wherein the casting half-mould is made of a polyolefine.

11. A casting half-mould according to claim 9, together with a complementary casting half-mould comprising a casting mould, a plurality of said casting moulds being arranged in a battery with spacer plates being inserted between consecutive moulds.

12. A casting half-mould according to claim 9, wherein said impression has one of said undercut portions arranged to form a bezel.

13. A casting half-mould according to claim 9, wherein said impression has hollowed in it at least one of said undercut portions defining a seat arranged to receive an insert which is to be secured in the part to be moulded.

14. A casting half-mould according to claim 9, wherein at least one clipping element is provided spaced from the impression, said clipping element being cooperable with a complementary clipping element on a complementary half-mould.

15. A casting half-mould according to claim 14, wherein the surface of said complementary half-mould opposite to said impression is fitted onto a spacer plate.

* * * * *